Figure 1:
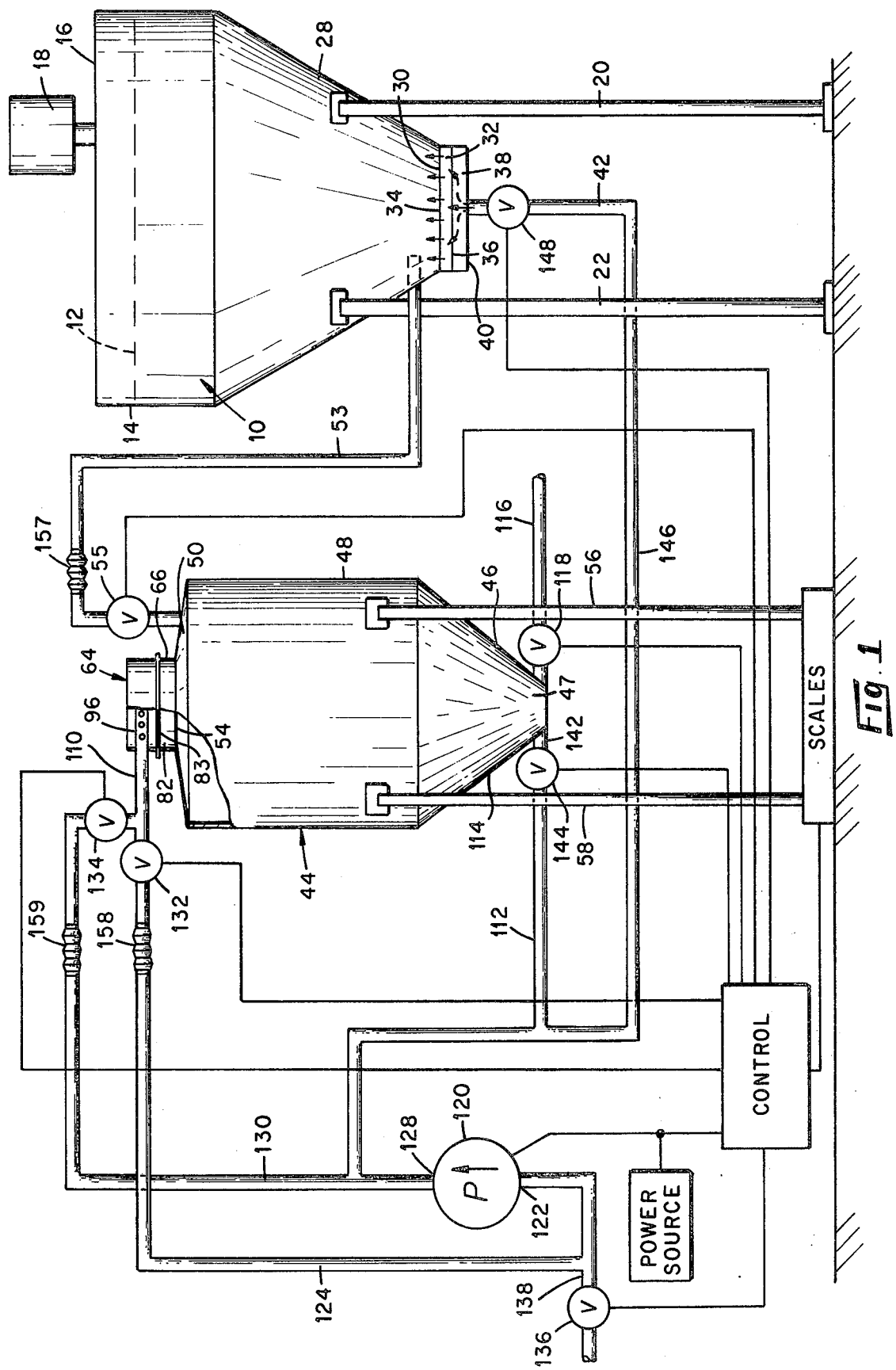

United States Patent [19]

Freeman

[11] 4,005,908
[45] Feb. 1, 1977

[54] BATCH TRANSFER SYSTEM
[76] Inventor: Billy P. Freeman, P.O. Box 245, Blaine, Tenn. 37709
[22] Filed: Feb. 3, 1975
[21] Appl. No.: 546,422
[52] U.S. Cl. .................................. 302/3; 55/482; 55/486; 302/23; 302/53; 302/59
[51] Int. Cl.² ............................................. B65G 53/28
[58] Field of Search .............. 302/3, 17, 21, 23, 45, 302/47, 52–55, 57, 58, 59; 55/482, 486, 487, 502, 514; 210/445

[56] References Cited
UNITED STATES PATENTS

| | | | |
|---|---|---|---|
| 276,879 | 5/1883 | Randolph | 302/3 |
| 2,946,626 | 7/1960 | Atkinson et al. | 302/23 |
| 3,069,205 | 12/1962 | McIver et al. | 302/17 |
| 3,186,768 | 6/1965 | Pendelton | 302/3 |
| 3,212,824 | 10/1965 | Emery et al. | 302/52 |
| 3,309,148 | 3/1967 | Wilder | 302/53 |
| 3,374,910 | 3/1968 | Hermanns | 302/53 |
| 3,378,310 | 4/1968 | Christensen | 302/17 |
| 3,424,501 | 1/1969 | Young | 302/21 |
| 3,620,575 | 11/1971 | McIver et al. | 302/53 |
| 3,822,919 | 7/1974 | Strom | 302/52 |
| 3,861,753 | 1/1975 | Lesk et al. | 302/52 |

Primary Examiner—John J. Love
Assistant Examiner—Jeffrey V. Nase
Attorney, Agent, or Firm—Fitch, Even, Tabin & Luedeka

[57] ABSTRACT

A system for transferring a batch of particulate material from a storage area to a remote depository, including a storage vessel connected to a batching vessel, and a single pump providing both vacuum and pressure conditions for conveying the particulate material. In a preferred embodiment there is provided a control circuit responsive to the quantity of the particulate material in the batching vessel for regulating the system.

7 Claims, 6 Drawing Figures

BATCH TRANSFER SYSTEM

This invention relates to a system for pneumatically transferring a batch of particulate material from a first vessel to a remote location employing a vacuum-pressure concept.

"Vacuum-pressure" transfer of particulate material as used in the art generally refers to the development of a vacuum in a receiving vessel to induce the flow of particulate material into such vessel from a storage or other vessel. Thereafter, the receiving vessel is pressurized to force the particulate material out of the receiving vessel to a remote location. U.S. Pat. No. 279,034 to Smith discloses an early vacuum-pressure transfer system.

The existing vacuum-pressure transfer systems are limited in various ways. Some require reversible blowers; others require separated suction and blower means. Certain of the prior art systems are highly dependent upon the natural flow characteristics of the particulate material hence are limited as to the time in which a desired transfer can be made. Consequently there has been a persistant need in the art for an efficient and economical system for transferring batches of particulate material between separate locations.

Figure 2:
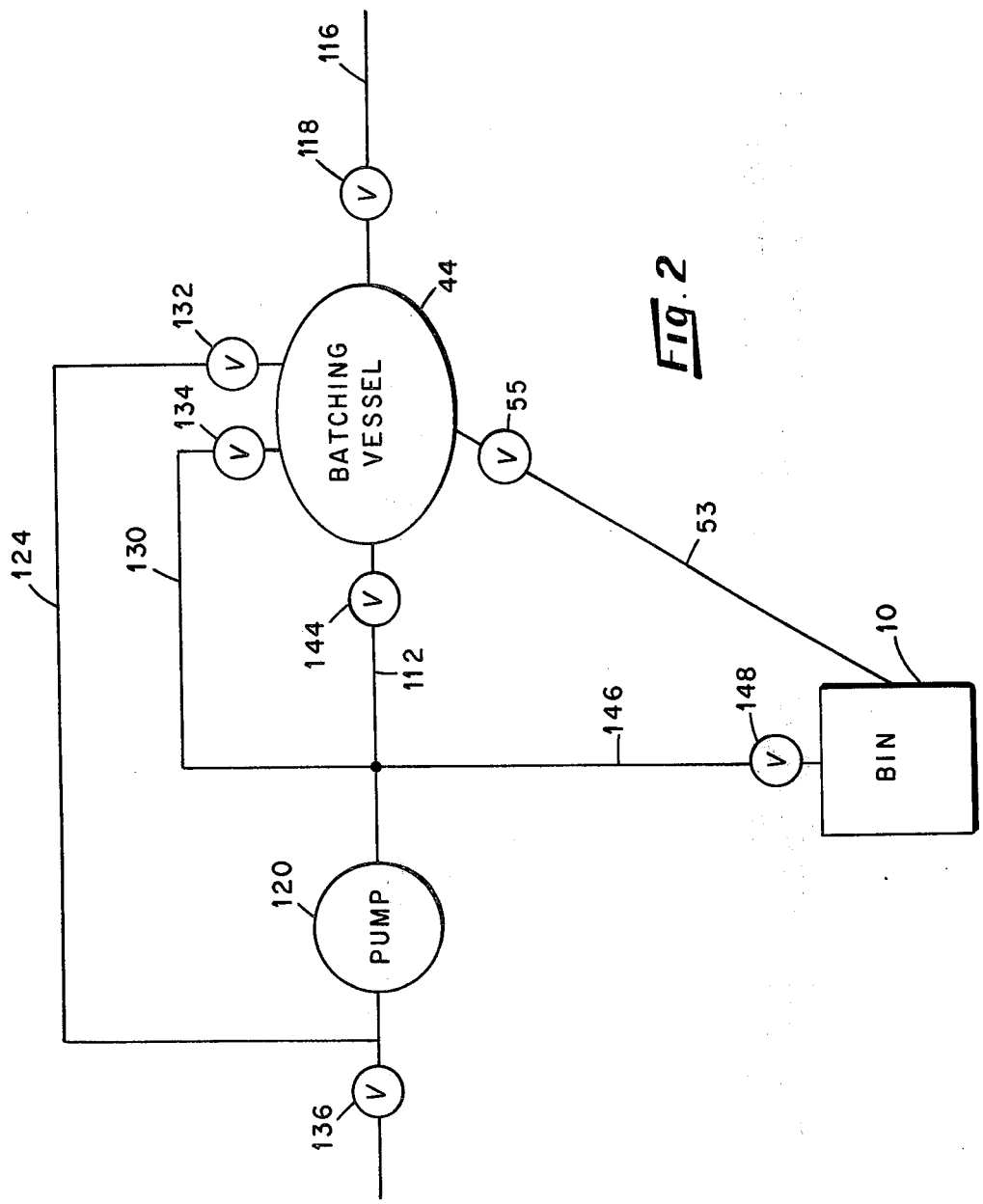
Figure 3:
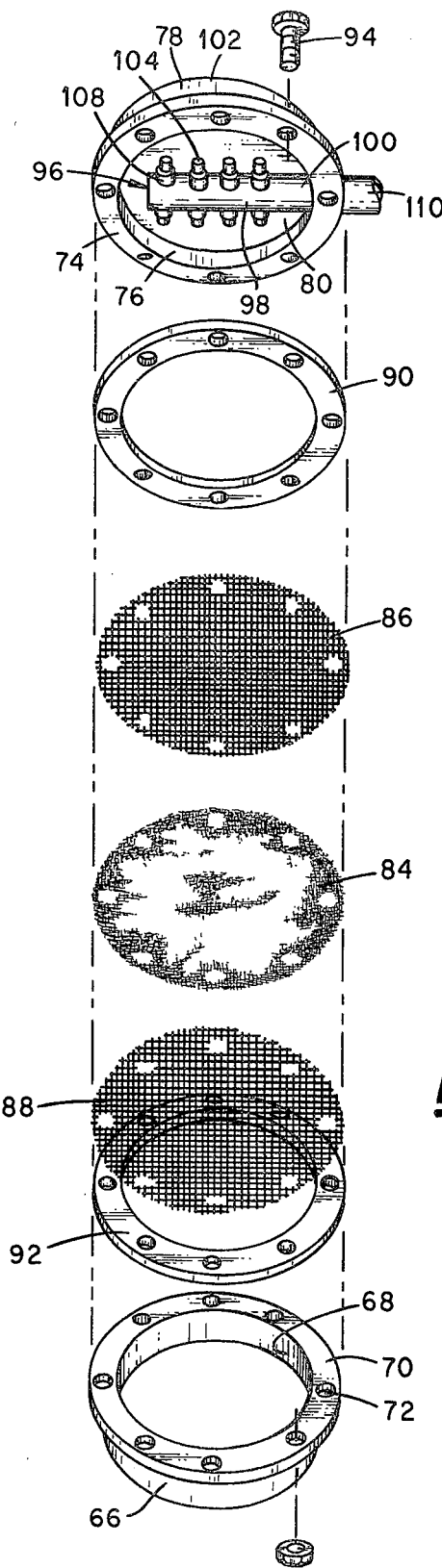
Figure 4:
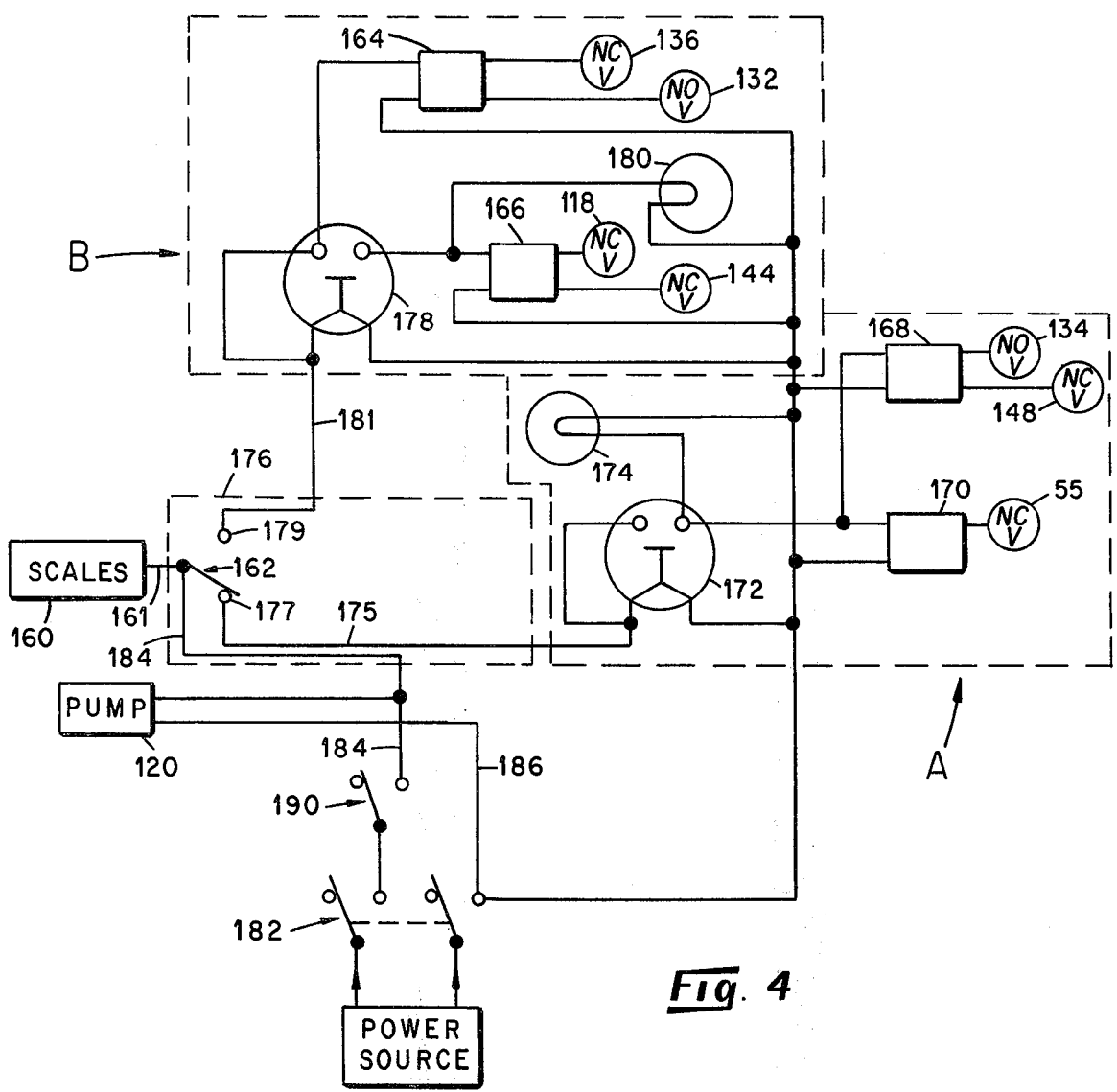
Figure 6:
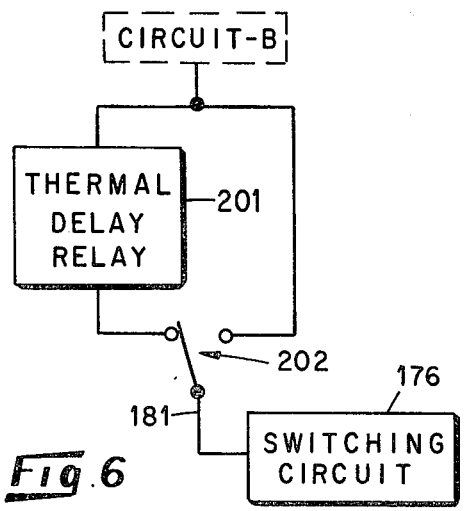
Figure 5:
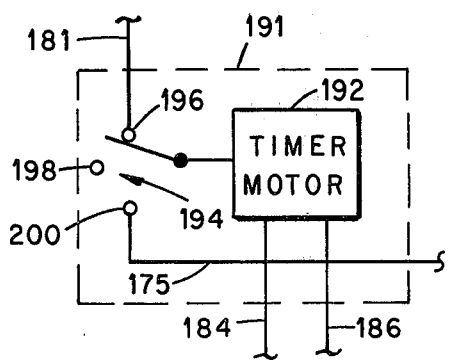

It is an object of this invention to provide a system for pneumatically transferring a batch of particulate material from a first vessel to a remote depository, employing a single gas pump. It is another object of this invention to provide an automated batch transfer system for particulate material. Other objects will become apparent from the following description including the drawings in which:

FIG. 1 is a schematic view, in front elevation, of a system embodying various features of the invention, FIG. 2 is a schematic flow diagram of the system of FIG. 1, FIG. 3 is an exploded view of a filter suitable for use in the system of FIG. 1, FIG. 4 is a control circuit diagram suitable for controlling the operation of the system shown in FIG. 1, and, FIG. 5 and FIG. 6 are alternative switching circuit diagrams for circuitry for introducing a time delay in the control circuit of FIG. 4.

As disclosed herein, the transfer system includes a first vessel, e.g., a storage bin, having a tapered, preferably conical, bottom portion, the apex of which is lowermost and defines an opening, a second vessel, e.g., a batching vessel, connected to the interior bottom region of the storage bin by a conduit suitable for pneumatically conveying particulate material from the bottom of the bin into the top region of the batching vessel when a vacuum is induced in the batching vessel, the batching vessel also having a downwardly tapered, preferably conical, bottom portion provided with a pneumatic material transfer device. A single gas, i.e., air pump having a suction inlet and a blower outlet provides both the vacuum and pressure required in the operation of the system. To this end, the blower outlet of the pump is connected by conduit means to the top region of the batching vessel, to the material transfer device and to the bottom portion of the storage bin. The suction inlet of the pump is connected by conduit means to the top portion of the batching vessel and is further selectively open to the atmosphere. Filter means is interposed between the batching vessel and the pump to prevent the transfer of particulate material to the pump. Appropriate valves are interposed in the system to selectively regulate the flow of air within the system.

In a preferred embodiment, a control circuit responsive to the quantity of the particulate material in the batching vessel controls sequencing of the valves to automatically regulate the flow of the particulate material.

Referring to FIG. 1, the illustrated batch transfer system includes a first vessel, i.e. a storage bin 10, suitable for receiving and storing particulate material 12. In one embodiment, the top 14 of the bin 10 is provided with a removable cover 16 and vented to the atmosphere through a filter 18. Legs 20, 22, 24 and 26 (24 and 26 not visible) are provided for supporting the bin. In a preferred embodiment, the bin 10 includes a bottom section 28 that is tapered downwardly, such section preferably being substantially conical and truncated to define a bottom opening 30 in the bin. This bottom opening is fitted with a porous plate 32 having its upper face 34 exposed to the interior of the bin and its opposite and bottom face 36 exposed to a plenum 38 defined by a housing 40 to which there is connected a conduit 42 suitable for introducing pressurized air into the plenum 38, hence through the porous plate 32 in a multiplicity of streams to the interior of the bin 10 as will appear more fully hereinafter.

Particulate material is transferred in batch quantities from the storage bin 10 to a second vessel, e.g., a batching vessel 44. The illustrated batching vessel 44 includes a downwardly tapered bottom section 46, preferably conical in geometry with the apex 47 thereof being truncated, a central cylindrical section 48, and an upwardly tapered top section 50 that defines a cover 52 having a generally centrally located opening 54. Legs 56 and 58, and 60 and 62 (not visible) are secured to the wall of the central section 48 for supporting the vessel. A conduit 53 suitable to convey particulate material entrained in air connects the top section 50 of the batching vessel to a location within and adjacent the bottom of the bin 10. A valve 55 interposed within the conduit 53 serves to regulate the flow of material through this conduit.

The cover 52 in the illustrated batching vessel 44 is provided with a filter assembly 64 comprising annular base section 66 secured to the cover 52 about the circumference of the opening 54. The upper edge 68 of the base section 66 is provided with an annular flange 70 having spaced apart holes 72 through the thickness thereof and is adapted to receive a like annular flange 74 on the bottom edge 76 of a generally cylindrical housing 78 whose top end 80 is closed so that the housing 78 and base section 66 collectively define a filter chamber 82.

A primary filter sub-assembly 83 is provided within the filter chamber as by interposing between the flanges 70 and 74, a sub-assembly comprising at least one filter fabric sheet 84 sandwiched between two screen discs 86 and 88 whose perimetral margins are overlaid by annular seals 90 and 92 and clamped between the annular flanges 74 and 70 of the housing 78 and base 66, respectively, as by bolts 94 extending through registered openings in the flanges.

In the illustrated embodiment, a secondary filter sub-assembly 96 is provided within the filter chamber 82 and includes a manifold 98 mounted at one of its ends 100 in the wall 102 of the housing 78. This manifold 98 extends in cantilevered fashion into the interior of the filter chamber 82 and above the primary filter 83. The manifold is provided with a plurality of porous caps 104 whose respective open ends are threadably mounted in appropriately threaded lugs 108 provided at spaced apart locations along the length of the manifold so that the interior of the manifold is in fluid communication with the interior of the filter chamber. A conduit 110 is attached to that end 100 of the manifold which is mounted in the housing wall 102 so that there is fluid communication between the conduit 110 and the interior of the manifold 98.

In order to discharge particulate material from the batching vessel 44, an inlet conduit 112 is connected to one side of the wall 114 of the conical bottom section 46 so that pressurized fluid can be injected into the lowermost interior portion of this bottom section 46 by way of the conduit 112. Diametrically opposite the location of the inlet conduit 112, there is connected to the vessel wall 114 a discharge conduit 116 suitable to convey pneumatically entrained particulate material from the lowermost region of the bottom section 46 to a desired remote location. A valve 118 interposed in the discharge conduit 116 serves in regulating the flow of gas and particulate material through this conduit. Desirably, the lower end of the batching vessel 44 is truncated to eliminate any substantial portion of the vessel below the position of entry of the conduit 112 into the vessel so that each discharge operation fully evacuates the vessel 44. A further suitable discharge connection is one of the type shown in FIG. 4 of U.S. Pat. No. 3,671,079 to W. D. Huffaker.

The illustrated system anticipates alternately evacuating and pressurizing the batching vessel 44 for purposes of accumulating a batch of particulate material in the vessel by means of a vacuum transfer and thereafter discharging the batch with the aid of pressurization of the vessel. In the present disclosure, evacuation of the batching vessel and at least initial pressurization of the vessel is accomplished in part by a single gas pump 120 whose input side 122 is connected through the filter assembly 64 to the interior of the batching vessel. In the illustrated embodiment, this connection is by means of a conduit 124 and further conduit 110 connected to the end 100 of the manifold 98 of the filter sub-assembly 96 provided atop the batching vessel 44. The output side 128 of the pump 120 is also connected to the end 100 of the manifold 98 as by a conduit 130 and the conduit 110. Valve means 132 interposed in the conduit 124 and valve means 134 interposed in the conduit 130 function to regulate the flow of air through each conduit. The input side of the pump 120 may be opened to atmosphere by means of a valve 136 connected by a conduit 138 into the conduit 124. Accordingly, by selective control of the flow of air in the conduits 124, 130 and 110, the single gas pump 120 serves both to evacuate the vessel 44 and to aid in pressurization of the vessel through the filter assembly 64. It will be recognized that equivalent connection and regulation of the gas flow between the pump 120 and the filter assembly is accomplished by the use of a three-way valve disposed in conduit 124 in lieu of the valve 136 and the conduit 138. Similarly, one skilled in the art, given the present disclosure will recognize equivalent alternative arrangements of the several conduits and valves to achieve equivalent functioning of the system. For example, the conduits 124 and 130 could be combined with appropriate and relatively slight changes in the illustrated control means.

Referring to FIG. 1, the output side 128 of the pump 120 is further connected by the conduit 112 whose end 142 is connected in fluid communication with the bottom section 46 of the batching vessel 44. A valve 144 interposed in the conduit 112 functions to regulate the flow of air from the pump to the batching vessel for discharging particulate material from the vessel and pressurization of the vessel as will be further described hereinafter.

Further, the output side 128 of the pump 120 is connected by a conduit 146 to the plenum 38 at the bottom of the storage bin 10. By means of a valve 148 interposed in the conduit 146, during the transfer of particulate material from the bin to the batching vessel, air is supplied from the output side of the pump 120 to provide at least partial fluidization of the particulate material within the bin 10 and thereby enhance the flow of particulate material to the batching vessel 44.

One or more of the valves 132, 134, 136, 144, 148, 55 and 118 may be manually operable between their open and closed positions. Preferably, each of these valves is of a type which can be operated from a remote location. This may be achieved employing conventional hydraulically operable valves whose operation is controlled through suitable electrical circuitry means.

In an operational cycle, the disclosed system includes evacuation of the batching vessel 44 to develop a low pressure, e.g., a vacuum, therein relative to the pressure in the storage bin 10, conveying particulate material from the bin to the batching vessel while introducing pressurized air to the bottom of the storage vessel to aid in entrainment and flow of the particulate material to the batching vessel, stopping the flow of particulate material to the batching vessel, pressurizing the batching vessel with the particulate material therein, introducing pressurized air to the bottom section of the batching vessel to entrain particulate material and convey it from the batching vessel through the discharge conduit to a remote location and to aid in pressurizing the batching vessel while at least partially fluidizing the particulate material as air flows from the bottom of the vessel to the region within the vessel above the level of particulate material.

In operation, the disclosed system may function in a continuously cycling mode, i.e., the batching vessel may be charged and discharged without a significant time lag between the phases within a cycle or between successive cycles. Alternatively, the system may be provided with dwell time between charging and discharging or between discharging and charging as is compatible or desired in a given application of the system. For example, in a bakery, it may be desirable to continuously cycle the system with successive batches being conveyed to individual ones of a number of dough mixing vessels. In a cement plant, however, it may be required that there be a waiting time following charging of the batching vessel before it is discharged. In the continuous cycling operation, preferably each of the several valves in the system is automatically opened or closed so that minimum operator attention need be given to the system while it is functioning. Automatic regulation of the operation of the system with built-in dwell time or times is obtained such as through the use of time relays in an electrical control circuit.

In either event, in an operation of the illustrated system, commencing with particulate material 12 in the storage bin 10 and the batching vessel 44 discharged, the pump 120 is turned on and valve 132 is opened to cause air to be withdrawn from the interior of the batching vessel through the input side of the pump 120 and reduce the pressure therein relative to the pressure within the storage bin. Valve 136 is closed during this operation. Valve 55 is opened to start the flow of particulate material from the bin into the batching vessel. Valve 148 is opened to admit pressurized air from the output side 128 of the pump 120 to the plenum 38, thence through the porous plate 32 in a multiplicity of flow streams to the interior of the bin at least partially fluidize the particulate material in the bin and enhance its entrainment and transfer through the conduit 53 into the batching vessel. When the desired quantity of particulate material has been transferred into the batching vessel, valves 132, 148 and 55 are closed, stopping the transfer of material into the batching vessel. If desired, at this point in the cycle a dwell time is conveniently provided.

To discharge the batching vessel, the pump is in the "on" mode and valve 136 is opened to open the input side 122 of the pump to ambient atmosphere. Valve 134 is opened to admit pressurized air from the output side 128 of the pump through the filter assembly 64 into the batching vessel to at least substantially increase the pressure in the region of the batching vessel above the level of the particulate material therein. Valves 118 and 144 are opened so that pressurized air from the output side of the pump is introduced through the conduit 112 into the lowermost portion of the bottom conical section of the batching vessel in a direction toward the discharge conduit 116 and particulate material is entrained by the flowing air and conveyed out of the batching vessel through the discharge conduit 116. Simultaneously, a portion of the air introduced into the batching vessel through the input conduit 112 flows upwardly through the particulate material in the batching vessel to at least partially fluidize the particulate material and to aid in pressurizing the region within the batching vessel above the changing level of the particulate material therein.

In one embodiment, the quantity of particulate material transferred into the batching vessel during the charging thereof is determined by weight. This is accomplished by mounting the batching vessel on a set of scales 160 whose balance arm 161 or other member (FIG. 4) serves to close a switch 162 in an electrical control circuit that functions to regulate the operation of the system. To this end, the conduits 53, 124 and 130 are each provided with flexible couplings, 157, 158 and 159, respectively, to allow for vertical movement of the vessel 44. Various equivalent modifications of such arrangement will be apparent, given the present disclosure.

With reference to FIGS. 1, 2 and 4, in one embodiment of the disclosed system, valves 136, 148, 55, 118 and 144 are each normally closed two-way valves and valves 132 and 134 are normally open two-way valves, each of whose respective opening or closing is accomplished by solenoids 164 (opens valves 136 and closes valve 132), 166 (opens valves 118 and 144), 168 (closes valves 134 and opens valve 148) and 170 (opens valve 55). These valves suitably are hydraulically operated and the hydraulic flow thereto is regulated by the solenoids acting through appropriate other valves as is known in the art. Alternatively, the several valves may be operated directly by the solenoids. The solenoids 168 and 170 are connected with a first thermal delay relay 172 and a lamp 174 in a charging circuit "A" that is energized by an appropriate signal from a switching circuit 176. Solenoids 164 and 166 are connected with a second thermal delay relay 178 and a lamp 180 in a discharging circuit "B" that also is energized by an appropriate signal from the switching circuit 176 whose function is to select which, if either, of circuits A and B is energized at a given time. This circuit 176 suitably comprises the switch 162 and a lead 175 connecting one terminal 177 of the switch 162 to circuit A and a lead 181 connecting the other terminal 179 to circuit B, thereby selectively energizing these circuits by connecting each at the appropriate time to the lead 184 from the electrical power source.

A main switch 182, when closed, supplies power to the pump 120 and to the switching circuit 176 through leads 184 and 186, one of which has interposed therein a manual switch 190 that serves at a "start" – "stop" switch for the overall operation of the control circuit.

Upon the closing of switch 162 by reason of the weight of particulate material in the batching vessel being of the required amount to activate the scales 160 to close switch 162, the switching circuit 176 sends a signal to circuit A, activating only the thermal delay relay 172. After a brief delay, sufficient to ensure that the discharging circuit B has been deenergized and valves 136, 118 and 144 have closed and valve 132 has opened, 168 and 170 are substantially simultaneously energized to open valve 55, hence open the conduit 53 leading between the bin 10 and the batching vessel 44 for the flow of particulate material therethrough, to open valve 148 and commence the flow of air into the bottom of the bin 10, and to close valve 134 to stop the flow of pressurized air into the top of the batching vessel. At this point in time, circuit B, the discharging circuit, is not energized so that valves 136, 118 and 144 are closed, thereby closing off the input side of the pump from ambient atmosphere, and closing off the flow of air into the bottom of the batching vessel and through the discharge conduit 116. During the time the solenoids 168 and 170 are energized and the batching vessel is being charged, the lamp 174 is lighted.

When the weight of particulate material in the batching vessel reaches a predetermined amount, the scales 160 are satisfied and the switch 162 opens. This results in deenergizing of the charging circuit A and energizing the discharging circuit B. Immediately upon energization of this circuit B, 164 is activated to close valve 132 and stop the suction of air from the batching vessel and to open valve 136 to ambient atmosphere. After a time delay sufficient for valves 132 and 55 to close and valve 134 to open following deenergization of charging circuit A, and to stop the transfer of material into the batching vessel, the relay 178 closes to activate solenoid 166 for opening valves 118 and 144 to commence the discharge of particulate material out of the batching vessel. Lamp 180 is energized and remains lighted during the times the solenoid 166 is activated. Notably, during the time interval between initial energization of the discharge circuit B and the opening of valves 118 and 144 to commence the discharge, valve 134 is open to admit pressurized air into the top of the batching vessel to commence the build-up of pressure above the level of the particulate material in the vessel for assisting in the discharging of the particulate material out of the vessel and to provide a flow of air in a "reverse" direction through the filters.

A further suitable switching circuit 191 that does not require scales, but rather provides a time-dependent operational control over the operation of the system, is shown in FIG. 5 and includes a timing motor 192 connected to the leads 184 and 186. This motor 192 serves to operate a switch 194 of a type having three positions, namely a first position 192 which connects the electrical power source to circuit B, a second position 198 which is neutral, and a third position 200 which connects the electrical power to circuit A. Through selection of the time that the switch remains in the neutral second position 198, there is provided a time delay between the charging and discharging of particulate material in and from the batching vessel 44. Selection of the time operation of the timing motor provides for timed charging of the batching vessel and/or timed discharging of the vessel.

In FIG. 6 is illustrated a means for providing a time delay between charging and discharging of the batching vessel, employing a modification of the control circuit of FIG. 4. This means includes a thermal delay relay 201 and a switch 202 interposed in the lead 181 between the switching circuit 176 and circuit B so that by manual operation of the switch 202, there is interjected a time delay between the time of deenergization of circuit A and the time of energization of circuit B. Other equivalent modifications of the control circuitry will be apparent to one skilled in the art when given a particular set of desired operation parameters.

Notably, in the illustrated apparatus the filter assembly is mounted directly onto the top of the batching vessel. This has been found useful in minimizing maintenance of the filter assembly in that when the batching vessel has been charged and pressurization of the batching vessel commences, the reverse flow of air through the filters cleans the filters, particularly the primary filter sub-assembly 83, by dislodging therefrom the particulate material collected on the filters during the withdrawal of air during the charging operation. This dislodged material either falls or is carried by the air directly into the batching vessel thereby not requiring frequent dismantling of the filter assembly or other work normally associated with filter maintenance and/or recovery of material from the filter.

While a preferred embodiment of the present invention has been illustrated and described, it will be obvious to those skilled in the art that changes and modifications may be made therein without departing from the invention in its broader aspects. Various features of the invention are set forth in the following claims.

What is claimed:
1. In a system for pneumatically transferring particulate material in batches from a first location to a second and remote location the combination comprising
a first vessel for containing a quantity of said particulate material, said first vessel including a substantially conical bottom section having its apex directed downwardly and defining an opening therein,
a porous member covering said opening and defining a plurality of passageways therethrough,
a second vessel chargeable with and dischargeable of said particulate material and having a top section and a substantially conical bottom section having its apex directed downwardly,
first conduit means connecting said bottom section of said first vessel with said top section of said second vessel, said first conduit directing the flow of pneumatically entrained particulate material therethrough from said first vessel to said second vessel,
first valve means interposed in said first conduit means for regulating the flow of particulate material through said first conduit means,
filter means mounted on and in fluid communication with said top section of said second vessel and substantially prohibiting the movement of said particulate material therepast,
gas pump means having an input side and an output side,
second conduit means connecting said input side of said pump means in fluid communication with said filter means and including a portion connecting said input side of the pump means in fluid communication with ambient atmosphere,
second valve means interposed in said second conduit means for regulating the flow of fluid between said input side of said pump means and said filter means,
third valve means interposed in said second conduit means at a location between said input side of said pump means and that portion of said second conduit means that opens to ambient atmosphere for regulating the flow of ambient atmosphere to said input side of said pump means,
third conduit means connecting said output side of said pump means in fluid communication with said filter means,
fourth valve means interposed in said third conduit means for regulating the flow of fluid through said third conduit means,
fourth conduit means connecting said output side of said pump means in fluid communication with said porous member covering said bottom opening in said first vessel,
fifth valve means interposed in said fourth conduit means for regulating the flow of fluid through said fourth conduit means,
a fifth conduit directly connecting said output side of said pump means in fluid communication with one side of said conical bottom section of said second vessel adjacent the lowermost portion thereof for injecting pressurized fluid from said output side of said pump means into said bottom section of said second vessel for entraining particulate material from said second vessel in said fluid and conveying the same from said bottom section at a location substantially diametrically opposed to the location of the connection of said fifth conduit to said bottom section of said second vessel to a location remote from said second vessel,
sixth valve means interposed in said fifth conduit and adapted to regulate the flow of fluid through said fifth conduit,
means controlling the functioning of each of said valve means in a sequence providing cyclical withdrawal of fluid from said second vessel by said pump means with concomitant withdrawal of particulate material from said first vessel into said second vessel with at least a substantial portion of said withdrawn fluid being conveyed under pressure through said fourth conduit means and said porous member into the bottom section of said first vessel, and subsequent flow of fluid under pressure from said output side of said pump means to said top of said second vessel to provide a volume of pressurized fluid above the level of particulate material within said second vessel and flow of fluid under pressure through said fifth conduit into said bottom section of said second vessel to entrain particulate material from said second vessel and transfer the same out of said second vessel.

2. The system of claim 1 wherein said filter means comprises a primary filter and a secondary filter disposed in serial fluid communication with each other.

3. The system of claim 2 wherein said filter means includes a housing and said secondary filter comprises a manifold that is closed at one end and mounted at its other end to said housing, and a plurality of rigid porous filter members projecting from said manifold at locations spaced along the length of said manifold.

4. The system of claim 2 wherein said filter means comprises an annular base section secured along one of its end edges to said top section of said second vessel and having an annular flange on its unattached end edge, an annular top section having its top end closed and having an annular flange on its bottom end edge, said base and top sections defining a housing when connected to each other with their respective annular flanges in register, bottom and top screen members disposed across the interior dimension of said filter with their perimetral margins disposed between said registered annular flanges, a filter fabric sheet sandwiched between said screen members and supported thereby, and annular seal members interposed between said screen members and said flanges.

5. The system of claim 1 wherein said sequence of valve operation includes a time delay between the commencement of fluid flow from said output side of said pump to said filter means and the commencement of fluid flow from said output side of said pump and said bottom section of said second vessel.

6. The system of claim 1 wherein said porous member includes a plurality of passageways therethrough for the passage of pressurized fluid into said first vessel in a plurality of streams.

7. The system of claim 1 and including scale means supporting said second vessel and means connecting said scale means to said means controlling the functioning of each of said valve means, and wherein said sequencing of said valve means is dependent upon the weight of particulate material within said second vessel.

* * * * *